United States Patent Office 2,980,725
Patented Apr. 18, 1961

2,980,725
PROCESS FOR THE PREPARATION OF NITRILES FROM ALCOHOLS AND PHENOLS

William L. Fierce, Crystal Lake, and Walter J. Sandner, Carpentersville, Ill., assignors to The Pure Oil Company, Chicago, Ill., a corporation of Ohio No Drawing. Filed June 17, 1958, Ser. No. 742,504

9 Claims. (Cl. 260—465)

This invention relates to new and useful improvements in methods for preparing organic nitriles and more particularly to a method of preparing aliphatic and aromatic hydrocarbyl nitriles by reaction of cyanogen with alcohols or phenols at elevated temperatures in the presence of a high-surface-area, refractory catalyst.

The reaction of cyanogen with alcohols to form iminoethers is reviewed in the Chemistry of Organic Cyanogen Compounds, V. Migrdichian, 1947, page 89. Migrdichian reports that cyanogen and ethanol react at 0° C. in the presence of potassium cyanide to form principally cyanoformino ethyl ether, $C_2H_5OC(NH)CN$. In the presence of sodium ethylate, cyanogen and ethanol react to form oxalimino ethyl ether, $C_2H_5OC(NH)C(NH)OC_2H_5$. There is no report, however, of the reaction of cyanogen and alcohols other than in a catalyzed liquid-phase reaction, and hydrocarbyl nitriles have never been produced by this reaction.

It is therefore one object of this invention to provide an improved method for preparing aliphatic and aromatic hydrocarbyl nitriles.

Another object of this invention is to provide a method of preparing a variety of aliphatic and aromatic hydrocarbyl nitriles from alcohols and phenols.

A feature of this invention is the provision of a process for preparing aliphatic and aromatic hydrocarbyl nitriles by the catalyzed reaction of cyanogen and an alcohol or a phenol.

Another feature of this invention is the provision of a process for preparing aliphatic and aromatic hydrocarbyl nitriles, such as acetonitrile, propionitrile, acrylonitrile, benzonitrile, and the like, by the high temperature reaction of cyanogen and volatile alcohols and phenols, in the presence of a high-surface-area, refractory catalyst at a temperature in the range from about 300° to 700° C.

Other objects and features of this invention will become apparent from time to time throughout the specification and claims as hereinafter related.

This invention is based upon our discovery that hydrocarbyl monohydric alcohols or phenols will react with cyanogen in the presence of a high-surface-area, refractory catalyst at elevated temperatures to produce a substantial yield of aliphatic or aromatic hydrocarbyl nitriles. Catalysts which may be used in this process include such high-surface-area, refractory catalysts as activated charcoal, activated alumina, silica, silica-alumina, silica-zirconia, silica-alumina-zirconia, silica-titania, silica-alumina-titania, silica-beryllia, and silica-alumina-beryllia. When the reaction of alcohols or phenols with cyanogen is carried out in the presence of any of these catalysts in the temperature range from about 300° to 700° C., a substantial yield of a hydrocarbyl nitrile is obtained, in which the hydrocarbyl radical is derived from the alcohol or phenol.

This reaction proceeds well at atmospheric pressure, although it may be carried out at either subatmospheric or superatmospheric pressures. In carrying out this reaction, the preferred mol ratio of cyanogen to alcohol or phenol is in the range from 1:6 to 6:1. While the aforementioned range of proportions is somewhat preferred, the mol ratio of cyanogen to alcohols or phenols may vary widely, as for example, from 1:20 to 20:1, and still produce some hydrocarbyl nitrile as a reaction product. The reaction gases may be passed through the reaction zone at a gaseous hourly space velocity of approximately 50 to 2000, with a space velocity of 150 to 500 being preferred. In this process, the term "space velocity" refers to the ratio of the volume of reactant gases, at standard temperature and pressure, charged per hour, to the volume of the reactant space.

The preferred method of carrying out this process is to mix the alcohol or phenol to be reacted with cyanogen in the gaseous state and pass the mixture through a heated reaction zone containing the catalyst. When higher boiling alcohols or phenols are to be reacted, they are fed as liquids directly to the reactor and vaporized directly into the reaction zone. Any type of reaction zone may be used which is resistant to attack by the reactants or reaction products. Quartz, high-silica glass, stainless steel, or other refractory and corrosion-resistant materials may be used. The reaction zone may be heated by any suitable means, such as combustion gases applied externally to the heated reactor, external or internal electrical heaters, including resistance heaters and induction heaters, heating tubes extending through the reactor, or hot refractory pebbles in the reactor.

The product gases from the reaction zone consist of a mixture of hydrocarbyl nitriles and reaction by-products including hydrogen cyanide, ammonia, carbon dioxide, and carbon monoxide. These reaction gases are withdrawn from the reaction zone and cooled to a temperature sufficiently low to condense the nitriles and other condensible by-products. The charge gases and product gases are analyzed by the mass spectrometer.

The following non-limiting examples are illustrative of the scope of this invention.

EXAMPLE I

Two experiments were carried out in which methanol and cyanogen were heated at different temperatures, in the absence of a catalyst, in an attempt to effect a reaction therebetween. In these experiments, helium was bubbled through liquid methanol at room temperature and the resulting stream of helium plus methanol vapor was then mixed with cyanogen and passed through an empty electrically-heated tube of Vycor high-silica glass. The gas mixture charged to the reactor tube and the product gases were analyzed by a mass spectrometer to determine the composition of charge gas and the product gases. The experimental conditions and the results are set forth in Table I.

Table 1

| Run No | 71 | 72 |
|---|---|---|
| Temperature (° C.) | 512 | 645 |
| Gaseous hourly space velocity of charge gas | 181 | 187 |
| Mol ratio of cyanogen/methanol | 1.11 | 1.17 |
| Percent Cyanogen consumed | 0.5 | 7.3 |
| Percent Methanol consumed | 4.9 | 21.3 |
| Acetonitrile—Yield per pass:[1] | | |
| Based on cyanogen | 0.0 | 0.0 |
| Based on methanol | 0.0 | 0.0 |
| Acetonitrile—Selectivity:[1] | | |
| Based on cyanogen | 0.0 | 0.0 |
| Based on methanol | 0.0 | 0.0 |

[1] The yield per pass is defined as the mols of the indicated product formed, expressed as a percent of the mols of cyanogen charged. The selectivity is a similar percentage based upon the mols of cyanogen consumed.

From these two runs, it is seen that methanol and cyanogen do not react in the absence of catalyst to produce any acetonitrile. It is also seen that there is no appreciable reaction of cyanogen and methanol to produce anything at either of the temperatures investigated.

EXAMPLE II

In another series of runs, this process was carried out using activated alumina as a catalyst for the reaction of cyanogen with methanol. The procedure used was substantially the same as that used in the runs described in Example I. In these runs, helium was bubbled through liquid methanol at room temperature, and the resulting stream of helium plus methanol vapor was blended with cyanogen. The gaseous mixture was then passed through an electrically-heated tube of Vycor high-silica glass containing the activated alumina catalyst. The catalyst used was an activated alumina known as F-10 activated alumina, manufactured by The Aluminum Co. of America. The gas mixture charged to the reactor tube and the product gases were analyzed by mass spectrometer to determine the composition of the charge gas and the product gases. The experimental conditions and results are set forth in Table II:

Table II

| Run No | 91 | 92 | 82 | 83 |
|---|---|---|---|---|
| Temperature (° C.) | 360 | 426 | 563 | 659 |
| Gaseous hourly space velocity charge-gas | 335 | 337 | 377 | 372 |
| Mol Ratio of cyanogen/methanol | 1.15 | 1.14 | 1.29 | 1.49 |
| Percent Cyanogen consumed | 100 | 100 | 100 | 100 |
| Percent Methanol consumed | 100 | 100 | 100 | 100 |
| Acetonitrile-Yield per pass:[1] | | | | |
| Based on cyanogen | 5.8 | 11.7 | 26.3 | 19.0 |
| Based on methanol | 6.7 | 13.4 | 34.0 | 28.3 |
| Acetonitrile-Selectivity:[1] | | | | |
| Based on cyanogen | 5.8 | 11.7 | 26.3 | 19.0 |
| Based on methanol | 6.7 | 13.4 | 34.0 | 28.3 |

[1] The yield per pass is defined as the mols of the indicated product formed, expressed as a percent of the mols of cyanogen charged. The selectivity is a similar percentage based upon the mols of cyanogen consumed.

From this series of runs, it is seen that in the presence of activated alumina as catalyst, the conversion of cyanogen and methanol is 100%, with a production of an appreciable yield of acetonitrile at 360° C. and an optimum yield at about 560° C. This reaction is preferably carried out in the temperature range from 300° C. to 700° C.

EXAMPLE III

Helium is bubbled through liquid methanol at room temperature and the resulting stream of helium plus methanol vapor is blended with cyanogen. The gaseous mixture is then passed through an electrically-heated tube of Vycor high-silica glass containing activated charcoal as catalyst. The reactor tube is maintained at a temperature of about 500° C. The cyanogen and methanol are mixed in a mol ratio of about 1.2 and circulated at a gaseous hourly space velocity of about 350. The products of reactions include a substantial yield of acetonitrile, together with by-products of reaction consisting of carbon dioxide, carbon monoxide, ammonia and large quantities of hydrogen cyanide.

EXAMPLE IV

The process of Example III is repeated substituting silica-alumina (75% silica) as catalyst. As in the preceding examples, a substantial yield of acetonitrile is obtained when the reactants are passed over the catalyst at 500° C. As in the other examples, the optimum temperature range for this process is 300° to 700° C.

EXAMPLE V

The process of Examples III and IV is repeated substituting silica-gel as catalyst. When cyanogen and methanol are heated to about 500° C. and passed over the silica-gel, a substantial yield of acetonitrile is obtained.

EXAMPLE VI

The procedure of Example II is repeated substituting ethanol as a reactant. In this process, helium is bubbled through liquid ethanol at room temperature and the resulting stream of helium plus ethanol vapor is blended with cyanogen and passed through an electrically-heated tube of Vycor high-silica glass containing activated alumina as catalyst. The reaction tube is maintained at a temperature of about 500° C. The gas mixture charged to the reactor tube contains ethanol and cyanogen in approximately an equimolar ratio and the gas mixture is circulated at a gaseous hourly space velocity of about 350. The product of this reaction consists of a mixture of aliphatic nitriles consisting mainly of propionitrile, acrylonitrile, and acetonitrile. When this reaction is carried out at temperatures in excess of about 600° C., a higher proportion of acrylonitrile is obtained.

EXAMPLE VII

Aromatic nitriles, such as benzonitrile, may similarly be prepared by the reaction of phenols with cyanogen at elevated temperatures. Phenol is melted and metered to the reaction tube using a heated pump and heated flow lines to prevent solidification. The cyanogen is fed to the reaction tube through a separate line. The phenol vaporizes directly into the reaction tube which is heated to about 600° C. The reaction tube contains activated alumina as catalyst. The gaseous reaction products are withdrawn from the reaction tube and condensed, using an air-cooled condenser. Gaseous products passing through the condenser are analyzed by a mass spectrometer. The condensed products are dissolved in carbon tetrachloride and analyzed using an infrared spectrometer. At a gaseous hourly space velocity of 350, a reaction temperature of 600° C., and cyanogen/phenol mol ratio of about 1.1, a substantial conversion to benzonitrile is effected.

While this process has been described with considerable emphasis upon reactions of cyanogen with methanol, ethanol, and phenol, the process is operative with other alcohols and phenols which may be readily vaporized into the reactor. Other alcohols which may be used in this process include n-propanol, isopropanol, n-butanol, n-pentanol, 2-ethylhexanol, etc. As pointed out above, it is necessary that this reaction be carried out in the temperature range from about 300° to 700° C. using a high-surface-area, refractory catalyst.

Having thus described our invention as required by the patent statutes, we wish it to be understood that within the scope of the appended claims this invention may be practiced otherwise than as specifically described.

What is claimed is:

1. A method of preparing hydrocarbyl nitriles which comprises reacting cyanogen with a compound of the group consisting of low-molecular-weight, hydrocarbyl mono-hydric alcohols and phenols at a temperature in the range from about 300° to 700° C., in the presence of a high-surface-area, refractory catalyst, and recovering a hydrocarbyl nitrile in which the hydrocarbyl radical is derived from the alcohol or phenol reactant.

2. A method in accordance with claim 1 in which a low-molecular-weight alcohol and cyanogen are reacted over an activated alumina catalyst.

3. A method in accordance with claim 1 in which a low-melocular-weight phenol and cyanogen are reacted over an activated alumina catalyst.

4. A method in accordance with claim 1 in which methanol and cyanogen are reacted to produce acetonitrile.

5. A method in accordance with claim 1 in which ethanol and cyanogen are reacted to produce a mixture containing acetonitrile, acrylonitrile, and propionitrile.

6. A method in accordance with claim 1 in which phenol and cyanogen are reacted to produce benzonitrile.

7. A method in accordance with claim 1 in which the catalyst used is silica-alumina.

8. A method in accordance with claim 1 in which the catalyst is silica gel.

9. A method of preparing acetonitrile which comprises reacting cyanogen with methanol at a temperature in the range from about 300° to 700° C. in the presence of an activated alumina catalyst, and recovering acetonitrile from the reaction products.

No references cited.